(12) United States Patent
Brown et al.

(10) Patent No.: US 7,208,228 B2
(45) Date of Patent: Apr. 24, 2007

(54) EPOXY RESIN FOR FIBER REINFORCED COMPOSITE MATERIALS

(75) Inventors: James E. Brown, Puyallup, WA (US); Norimitsu Natsume, Kent, WA (US); Nobuyuki Odagiri, Renton, WA (US); Jeffrey J. Hawkey, Tacoma, WA (US); Brian S. Hayes, Ludington, MI (US)

(73) Assignee: Toray Composites (America), Inc., Tacoma, WA (US)

( * ) Notice: Subject to any disclaimer, the term of this patent is extended or adjusted under 35 U.S.C. 154(b) by 0 days.

(21) Appl. No.: 10/420,776

(22) Filed: Apr. 23, 2003

(65) Prior Publication Data

US 2004/0214007 A1    Oct. 28, 2004

(51) Int. Cl.
*B32B 27/38* (2006.01)
*B32B 27/04* (2006.01)
*B32B 27/18* (2006.01)
*C08L 63/00* (2006.01)

(52) U.S. Cl. ............... 428/413; 428/297.4; 523/400; 525/523; 525/524; 525/529

(58) Field of Classification Search ............ 428/297.7, 428/375, 396, 413, 414, 523; 525/523, 529; 523/400
See application file for complete search history.

(56) References Cited

U.S. PATENT DOCUMENTS

| | | | |
|---|---|---|---|
| 4,129,670 A * | 12/1978 | Riew | 427/386 |
| 4,500,660 A | 2/1985 | Minamisawa et al. | |
| 4,883,712 A * | 11/1989 | Ogawa et al. | 428/367 |
| 6,302,666 B1 | 4/1994 | Hino et al. | |
| 6,013,730 A | 1/2000 | McGrail et al. | |
| 6,063,839 A * | 5/2000 | Oosedo et al. | 523/206 |
| 6,287,696 B1 | 9/2001 | Noda et al. | |
| 6,429,157 B1 * | 8/2002 | Kishi et al. | 442/227 |
| 6,451,876 B1 * | 9/2002 | Koshy | 523/219 |

OTHER PUBLICATIONS

R. A. Pearson, et al., "Toughening mechanisms in elastomer-modified epoxies", Journal of Materials Science 21 (1986) p. 2475-2488.
R. A. Pearson, et al., "Influence of particle size and particle size distribution on toughening mechanisms in rubber-modified epoxies", Journal of Materials Science 26 (1991) p. 3828-3844.
D. Verchere et al., "Rubber-modified epoxies. IV. Influence of morphology on mechanical properties", Journal of Applied Polymer Science, vol. 43, p. 293-304 (1991).
A. F. Yee et al., "The importance of constraint relief caused by rubber cavitation in the toughening of epoxy", Journal of Materials Science 28 (1993) p. 6392-6398.
B. J. Caldwell et al., "Rate and temperature effects on the fracture toughness of a rubber-modified epoxy", POLYMER, 1993, vol. 34, No. 8, p. 1695-1701.

* cited by examiner

*Primary Examiner*—Michael J. Feely
(74) *Attorney, Agent, or Firm*—Morrison & Foerster LLP

(57) ABSTRACT

An epoxy resin composition for a cured material, comprising (A) an epoxy resin comprising an epoxy compound X, the epoxy compound X has an epoxy equivalent weight of at least 400, (B) a curing agent, and (C) a liquid rubber that is liquid at room temperature and comprises a reactive group; wherein the epoxy compound X has a solubility parameter value of SpX, the liquid rubber has a solubility parameter value of SpY and the ratio of SpY/SpX could be in the range of 0.7 to 1.3; and wherein the liquid rubber could form no visible domains by optical microscopy or has a maximum domain size of at most 3 microns in the cured material is described. The epoxy resin composition provides a fiber-reinforced material with higher compressive modulus and strength, toughness and better handling ability over standard epoxy resin systems. This invention is excellent for small thin walled tube structures like fishing rods or applications that require good compressive strength.

26 Claims, No Drawings

EPOXY RESIN FOR FIBER REINFORCED COMPOSITE MATERIALS

FIELD OF THE INVENTION

The present invention relates to epoxy resin compositions not only with high modulus capable of giving composite materials higher compressive strength and improved tube bending properties, but also with good tack capable of excellent process ability.

BACKGROUND OF THE INVENTION

Having excellent mechanical characteristics, fiber reinforced composite materials comprising, as the intermediate bases, prepregs that comprise reinforcing fibers and matrix resin are now widely used in sporting good, such as fishing rods, arrows, golf shafts and the like. Such composites are also used in the aerospace industry and other general industries since they are light in weight and excellent in mechanical properties.

Various methods are employed to produce fiber-reinforced composite materials. Above all, a method of using a prepreg, which is a sheet-like intermediate base to be prepared by impregnating reinforcing fibers with a matrix resin, is popularly used. Using this method, shaped articles are made by laminating a plurality of such prepregs followed by heating the resulting laminate.

Demand for lighter weight products in sporting goods with high strengths are desired. In particular, bending strength of thin tube structures like fishing rod tips, the durability and survival in the field from extreme use, is most desired. By improving the strength and durability of the fiber reinforced materials, lighter weight products can be produced at the same strength as current materials. This allows for either higher strength products at current weights or lighter weigh products at same strength. Both of which have benefits to the manufacture and consumer.

In recent years, sporting goods are being reduced in weight to maintain a marketing dominance (edge). This demand for lightweight designs requires stronger lighter weight materials. The breakage rate of these designs must maintain equal to or be improve over current products. The consumer will not accept lighter weaker sporting goods, nor will the manufactures. Of course, designs in the shape and lay-up can and has reduced the weight. However, this is now at the limit and improvements in resin/fiber system are necessary to push that limit.

In most cases lighter weigh also equates to better performance. Finished products in which weight has been removed require less energy to move are more efficient and usually more appealing to the consumer. The industry is requesting prepreg manufactures to invent stronger materials or improve existing materials to produce lighter weight products.

Matrix resins used for prepregs include both thermosetting and thermoplastic resins, but in most cases thermosetting resins are used. Epoxy resins are mainly used since they are easier to handle and process, have excellent mechanical and chemical properties such as heat resistance, stiffness, dimensional stability and chemical resistance.

Known methods to improve epoxy resin modulus and toughness include Japanese patent Publication No. 58-005925 which disclosed has high modulus, but paid no attention to improving tack and toughness. Another example is Mitsubishi Chemical (U.S. Pat. No. 5,302,666) which has adequate tack and toughness by utilizing bisphenol A type epoxy and solid rubber, however these techniques sacrifice modulus because of the formulation of the epoxy resin. Another example is Cytec patent U.S. Pat. No. 6,013,730 however this patent uses a solid rubber. To utilize solid rubber, it should be dissolved in solvent prior to use and remaining solvent in resin formulation causes voids in cured composite, which would weaken mechanical strength. Furthermore, this patent formulation may produce a resin that is too high in viscosity for making tubular products. Other examples of high modulus toughened systems are: Matsushita Japanese Patent Laid-Open No. 2001-302887 which discloses the combination of phenol novolak epoxy and a particle rubber to achieve high modulus and toughness, however such formulation gives insufficient tack. Toho Tenax U.S. Pat. No. 4,500,660 disclosed the combination of phenol novolak epoxy and tetrafunctional (TGDDM) resins, solid rubber and liquid rubber to obtain high adhesion between honeycomb core and Prepreg, however such formulation does not show high enough modulus.

SUMMARY OF THE INVENTION

This invention provides a high modulus, high compression strength resin system that produces high bending strength composite tubes where the prepreg used has good handling characteristics.

To realize this invention, an embodiment is an epoxy resin composition for a cured material, comprising:
an epoxy resin comprising an epoxy compound X, the epoxy compound X has an epoxy equivalent weight of at least 400,
a curing agent, and
a liquid rubber that is liquid at room temperature and comprises a reactive group;
wherein the epoxy compound X has a solubility parameter value of SpX, the liquid rubber has a solubility parameter value of SpY and the ratio of SpY/SpX is in the range of 0.7 to 1.3, and
wherein the liquid rubber forms no visible domains by optical microscopy or has a maximum domain size of 3 microns or less in the cured material.

The present invention also provides a prepreg to be prepared by impregnating reinforcing fibers with the above-mentioned epoxy resin compositions. Two or more of the above fibers maybe combined into one prepreg form. The present invention further provides a fiber-reinforced composite material comprising a cured product of the above-mentioned epoxy resin compositions and reinforcing fibers.

DETAILED DESCRIPTION OF THE INVENTION

One embodiment of this invention the epoxy compound X has a solubility parameter value of SpX, the liquid rubber has a solubility parameter value of SpY and the ratio of SpY/SpX is in the range of 0.7 to 1.3, preferably in the range of 0.8 to 1.2, and most preferably in the range of 0.9 to 1.1.

"Solubility parameter" of a polymer or rubber is determined by dissolving the polymer or rubber in a variety of solvents having different solubility parameters. The solvent in which maximum swelling of the polymer or rubber will take place is when the solubility parameter of the polymer or rubber matches the solubility parameter of the solvent. The details for the determination of solubility parameter are found in textbooks such as "Principles of Polymer Systems" by F. Rodrigues 23–30 (1982).

Another embodiment of this invention is an epoxy resin composition for a fiber-reinforced composite material comprising;
(A) Epoxy resin comprising at least one epoxy compound having epoxy equivalent weight of at least 400.
(B) Curing agent
(C) Liquid rubber comprising (i) at least 10 wt % of acrylonitrile as a its component and (ii) reactive group.

The liquid rubber is capable of being dispersed in the cured material formed by the epoxy resin composition cured by the following cure schedule:
a first cure at 80° C. for 120 minutes
a second cure at 120° C. for 60 minutes; and
a third cure at 135° C. for 90 minutes.

"Dispersed" in this invention means that the rubber exists as domains of at most 3 microns in phase separated morphology or is homogeneous in a cured material formed by curing the epoxy resin composition. It is preferable that the rubber exists as domains of at most one micron or is homogeneous. It is more preferable that the rubber exists as domains of at most 0.6 micronin phase or is homogeneous.

The constitutive element (A) is a single epoxy resin or a mixture of plural epoxy resins to increase compatibility between epoxy resin and rubber to obtain good toughness and good compression strength. The epoxy resin to be used herein is a compound having one or more groups in one molecule. Element (A) epoxy resin comprises at least one kind of epoxy resin which epoxy equivalent weight (EEW) is at least 400, preferably EEW is from 600 to 3000, more preferably EEW is from 800 to 1700. To obtain better balance of modulus and toughness, it is desirable that the amount of this epoxy which EEW is at least 400 is from 0.5 to 40 parts by weight per 100 parts by weight of total epoxy resin, preferably from 0.5 to 20 parts by weight per 100 parts by weight of total epoxy resin, more preferably from 1.0 to 15 parts by weight per 100 parts by weight of total epoxy resin. It preferably includes epoxy resins to be derived from precursors of phenols and amines in view of the mechanical properties of the (cured) epoxy resins and of the reactivity thereof with curing agents. It is more preferable that element (A) comprises bisphenol epoxy resin as shown in following figure.

hydroxynaphthalene, dihydroxybiphenylfluorene, trishydroxylmethane, tetrakishydroxphenlylethane, novolaks, condensates of dicyclopentadiene and phenols, etc.

Epoxy resins to be derived from precursors of amines are abstained by reacting amines and epichlorohydrin. The precursors include, for example, tetraglycidyldiaminodiphenylmethane, aminophenol, aminocresol, xylenediamine, etc.

In the present invention, it is preferable to use an epoxy resin whose functionality is at least 2.2 with element (A) epoxy resin. If the epoxy resin composition is kept high in cross linking density and small in the distance between cross linking points, the compressive modulus of the cured resin can be effectively enhanced. An epoxy resin whose functionality is at least 2.2, more preferable epoxy resin of the invention is selected at least one from the group of a novolak type resin consisting of phenol-novolak, glycidyl amine or cresol-novolak resins. This component is at least 50% of the major constituent in the present invention. It is desirable that the bi-functional epoxy resin is contained by 70 to 100 wt %; preferably 80 to 100 wt % based on the weight of all the epoxy resins. This component gives the resin the high modulus and compression strength, which improves the compressive strength of a bending tube. If the amount is less than 50 wt %, the compression strength of the cured resin may become lower.

The curing agent to be used as the constitutive element (B) includes, for example, aromatic amines such as diaminodiphenylmethane, diaminodiphenylsulfone; aliphatic amines such as triethylenetetramine, isophoronediamine; imidazole derivatives; dicyandiamide; tetramethylguanidine; carboxylic acid anhydrides such as methylhexahydrophthalic anhydride; carboxylic acid hydrazides such as adipic acid hydrazide; carboxylic acid amides; polyphenol compounds; polymercaptans; Lewis acid complexes such as boron trifluoride-ethylamine complex, etc.

Additives with curing activity that are obtained by reacting the curing agents with epoxy resins can also be employed in the present invention.

Microcapsules of the curing agents are preferably employed, since they prolong the shelf life of the prepregs comprising them.

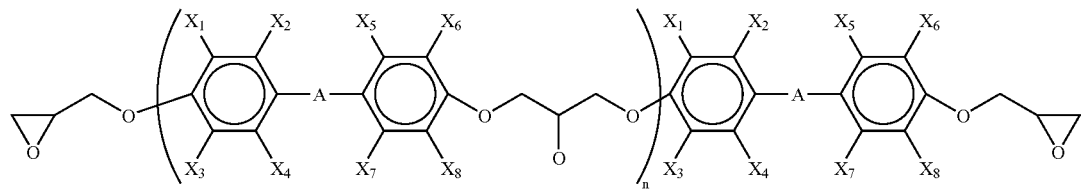

$X_1$~$X_8$: Hydrogen or arkyl which contains 1 to 3 carbon atoms independently, A: one selected from a group of $CH_2$, $CH(CH_3)$, $C(CH_3)_2$, $SO_2$, $C_6H_{12}$., n is natural number which is at least 2.

It is more preferable that A comprises at least one selected from $CH_2$ and $C(CH_3)_2$.

In this invention, epoxy resins other than element (A), including following epoxy resins, can be used with element (A)

Epoxy resins to be derived from precursors of phenols are obtained by reacting phenols and epichlorohydrin. The precursors include, for example, bisphenols such as bisphenol A and bisphenol F; resorcinol, dihydroxynaphthalene, tri- The curing agents can be combined with curing accelerators in order to increase their curing activity. Preferred examples include a combination of dicyandiamide and a curing accelerator selected from urea derivatives and imidazole derivatives, and a combination of a carboxylic anhydride or polyphenol compound and a curing accelerator selected from tertiary amines and imidazole derivatives.

Urea derivatives usable as the curing accelerator may be compounds that are obtained by reacting secondary amines with isocyanates. Concretely, one or more selected from the group of 3-phenyl-1,1-dimethylurea, 3-(3,4-dichlorophenyl)-1,1-dimethylurea (DCMU) and 2,4-toluene bis-dimethy urea are preferably used.

Element (C) liquid rubber improves toughness and tack of the prepreg system. The addition of the rubber improves the toughness, by reducing resin brittleness. In the present invention, it is preferable to use a rubber, which is liquid rubber with reactive group that has capability to react with epoxy functional group. The reactive group helps to increase compatibility between liquid rubber and epoxy. More specifically it is preferable to use liquid rubber of the butadiene-acrylonitrile copolymer having carboxyl groups on at least one of terminals of the molecule. The acrylonitrile content of the copolymer is preferably from 10 to 35 wt % from the view point of balance between solubility against epoxy and toughness, more preferably from 17 to 30 wt %, most preferably from 22 to 28 wt %. A balance between epoxy resin and rubber is desirable. The epoxy resin will improve modulus and compressive strength, but lower toughness. The rubber component improves toughness and tack handling. By changing the ratio of element (A) epoxy resin and element (C) liquid rubber, it's possible to adjust resin to specific end user needs. To obtain better balance of modulus and toughness, it is desirable that the amount of the element (C) is 0.1 to 5 parts by weight per 100 parts by weight of total epoxy resin, preferably the amount of the element (C) is 0.1 to 3 parts by weight per 100 parts by weight of total epoxy resin, more preferably the amount of the element (C) is 0.5 to 2 parts by weight per 100 parts by weight of total epoxy resin. It should be noted that element (C) liquid rubber can be pre-reacted with epoxy resin(s), especially element (A) epoxy resin and/or epoxy resin whose functionality is at least 2.2, more preferably element (A) epoxy resin, to increase compatibility between epoxy resin and liquid rubber. If such pre-reacted products between element (C) and epoxy resin(s) is employed, it is preferable that the amount of element (C) before pre-reaction in epoxy resin composition in this invention is within the range mentioned above.

Preferably, element (C) liquid rubber is dispersed in cured material obtained by pre-cured at 80 deg C. for 120 min and at 120 deg C. for 60 min, and then cured at 135 deg C. for 90 minutes to obtain good toughness and good compression strength.

Commercially available element (C) liquid rubbers preferably usable in the present invention include, for example, Hycar 1300×13 type rubber, which are a composed of a liquid Carboxyl Terminated Butadiene Acrylonitrile (CTBN) and contains 26 wt % of acrylonitrile, Hycar 1300×35, which are a composed of a liquid Amino Terminated Butadiene Acrylonitrile (ATBN) and contains 26 wt % of acrylonitrile.

Suitable thermoplastic additives can be added to prepregs made from the resin composition of the present invention to increase toughness. Such thermoplastic additives can include any one or more of polyvinylformals (PVFs) (more preferred), polymethylmethacrylates (PMMAs), polyarylethersulfones (PESs), polysulfones (PSFs), polyimides (PIs), polyetherimides (PEIs) and polyethylene oxides (PEOs). More preferred thermoplastic additives include PVFs and PESs. The most preferred thermoplastic additives include PVFs. The thermoplastic additives, when present, may be employed in any amount up to 8% by weight (based upon the weight of total blended composition). More preferred amounts range from 1 to 4%, and most preferred amounts range from 2.5 to 3.5% by weight.

Any one or more of such additives, for example, the thermoplastic resin, the hardened thermosetting resin and the elastomer additives, may be incorporated as organic particles, preferably fine organic particles. The size of the particles is preferably no more than 100 µm, preferably 5–50 µm. These particles are effective for improving the toughness of the resin and improving the impact resistance of the fiber reinforced composite. Such organic particles are generally employed in amounts of no more than 20, preferably no more than, 15% by weight (based upon the weight of total blended composition).

The thermoplastic resins which can preferably be used as the organic particles described above include polyamides. The thermosetting resins which can be preferably used as the organic particles described above include epoxy resins and phenol resins. Known polyamide particles include SP-500, produced by Toray Industries, Inc. and "Orgasole" produced by Atochem.

Elastomer particles which can be preferably used as the organic particles described above include crosslinked rubber particles, and core-shell type rubber particles obtained by graft-polymerizing a different polymer on the surfaces of crosslinked rubber particles. Known crosslinked rubber particles include XER-91 (produced by Japan Synthetic Rubber Co., Ltd.), which is a crosslinked carboxyl modified butadiene-acrylonitrile copolymer; and the CX-MN series (Nihon Shokubai K.K.) and the YR-500 series (produced by Tohto Kasei K.K.), each of which comprise fine acrylic rubber particles.

Known core-shell type rubber particles include "Kureha Paraloid" EXL-2655 (produced by Kureha Chemical Industry Co., Ltd.), which is a butadiene alkyl methacrylate styrene copolymer; "Stafiloid" AC-3355 and TR-2122 (both produced by Takeda Chemical Industries, Ltd.), each of which are acrylate methacrylate copolymers; and "PARALOID" EXL-2611 and EXL-3387 (both produced by Rohm & Haas), each of which are butyl acrylate methyl methacrylate copolymers.

Furthermore, for rheological control of the resin compositions of the present invention, inorganic fine particles such as finely powdered silica can be incorporated into the resin composition within a range from 0.01% to 5%, preferably from 0.02% to 3% by weight (based upon the weight of total blended composition), such that the toughness and elongation of the cured material is not impaired.

The morphology and location of the reinforcing fibers used in the present invention are not specifically defined. For example, long fibers as parallel in one direction, single tow, narrow tow, woven fabrics, mats, knitted fabrics, braids, chopped prepreg, etc, maybe employed.

In order to obtain lightweight shaped articles with higher bending strength, carbon fibers are especially preferably employed. In order to produce more lightweight sporting goods like fishing rods, it is desirable to use carbon fibers with high elastic modulus. The carbon fibers preferably have a modulus of elastic modulus of 200 GPa or more, more preferably from 280 to 600 GPa To produce prepregs in the present invention, employable is a wet method whereby the matrix resin is dispersed in solvent such as methyl ethyl ketone, methanol, acetone or such to thereby lower the viscosity of the resin followed by reinforcing fibers with the resulting solution, and a hot melt (dry) method of heating the matrix resin to thereby lower its viscosity followed by impregnating reinforcing fibers with the resin.

According to the wet method, reinforcing fibers are dipped in a solution of epoxy resin composition and then drawn up, and the solvent is vaporized in an oven or the like to obtain a prepreg.

According to the hot melt method, the epoxy resin composition is heated to lower its viscosity, directly applied to the reinforcing fibers to obtain a resin-impregnated prepreg; or alternatively, the epoxy resin composition is coated on a release paper or the like to form a resin-coated film, and the film is applied on to one or both surfaces of a sheet of reinforcing fibers and then pressed under heat to obtain a resin-impregnated prepreg. The hot melt method is preferred since no solvent in introduced or remains in the prepreg.

To produce a composite article from the prepreg, for example, a plurality of the prepreg sheets are laminated and subjected to pressure under heat to thereby cure the resins therein.

To apply heat and pressure to the laminate of prepregs, for example, employable are a autoclave method, pressing method, clam shell shaped mold with internal pressure from bladder or the like method, vacuum bag method, or a tape wrapping method. For the production of sporting goods, a tape-wrapping method, internal pressure from bladder method and autoclave are the most preferably employed methods.

The tape-wrapping method produces a cylindrical shaped article like a fishing rod or golf shaft, by wrapping prepreg around a mandrel. After the prepreg is wrapped around the mandrel, wrapping tape made of a thermoplastic material in film form is wrapped over the prepreg. The wrapping tape fixes the prepreg to the mandrel and thus applies pressure. The wrapping tape, prepreg, and mandrel are heated in an autoclave or oven thereby curing the resin in the prepreg. After this, the mandrel is pulled out from the cured prepreg to obtain the cylindrical article.

The internal pressure method, produces a cylindrical shaped article by wrapping prepreg around an inner pressure support such as a thermoplastic resin tube or the like to give a preform. This is set in a mold, and a high-pressure vapor is introduced into the inner pressure support to apply pressure to the preform while heating the mold to obtain the shaped article. This method is suitably employed for shaping articles with complicated forms, such as golf shafts and hockey sticks, etc. This method produces parts with good external dimensions, where the tape wrapping on mandrel method produces parts with good internal dimensions.

Without previously forming prepregs, the epoxy resin composition of the present invention may be directly applied to reinforcing fibers and then cured under heat. For this, for example, employable are a hand-lay-up method, a filament-winding method, a pultrusion-molding method, a resin-injection-molding method, a resin transfer molding method, etc. According to these methods, fiber-reinforced composite materials are also obtained. In these, two liquids, one comprising the essential components of the constitutive elements [A] and [C] and the other comprising a curing agent of the constitutive element [B], may be mixed just before use.

In the present invention composite materials are fiber-reinforced, which may be shaped by various methods such as those mentioned hereinabove. These articles can be shaped into various sporting goods, such as fishing rods, arrows, golf shafts, hockey sticks, etc., having excellent compression and bending strength than any conventional fiber-reinforced composite material in the prior art. A smaller amount of the former art can exhibit better bending strengths comparable to that of larger amounts of the latter. Therefore, using the former of the present invention, it is possible to design lightweight articles.

Next, the present invention is described in detail by means of the following examples, in which the compression and bending strengths were measured or evaluated under the conditions mentioned below.

Epoxy resin A is a diglycidyl ether of bisphenol A with a functionality of 2, having an EEW of 185–192 (sold as Epon™ 828, made by Resolution Performance Products).

Epoxy resin B is a diglycidyl ether of bisphenol A with a functionality of 2, having an EEW of 525–550 (sold as Epon™ 1001F, made by Resolution Performance Products).

Epoxy resin C is a diglycidyl ether of bisphenol A with a functionality of 2, having an EEW of 875–975 (sold as Epon™ 2004, made by Resolution Performance Products).

Epoxy resin D is a tetra glycidyl diamino diphenyl methane with a functionality of 4, having an EEW of 117–134 (sold as ELM434, made by Sumitomo Chemical Co., Ltd.).

Epoxy resin E is an epoxy phenolic Novalak resin with a functionality of 3.8, having an EEW of 191–210 (sold as DEN™ 439, made by Dow Plastics).

Curing agent A is DICY (sold as DYHARD 100S™, made by Degussa AG).

Curing agent B is 3,4-dichlorophenyl-N,N-dimehtylurea (sold as DYHARD UR200™, made by Degussa AG), referred to below as DCMU.

Curing agent C is 2,4-toluene bis-dimethyl urea (sold as OMICURE U-24™, made by CVC Specialty Chemicals, Inc.), referred to below as U24.

Liquid rubber A is butadiene-acrlonitrile copolymer, which contains 26 wt % of acrylonitrile (Hycar-CTBN 1300×13 made by B. F. Goodrich Chemical Co.)

Thermoplastic additive A is PVF powder (sold as Vinylek™ type K, made by Chisso K. K.).

Solid rubber A is butadiene-acrlonitrile copolymer, which contains 27 wt % of acrylonitrile (Nipol 1072 made by Zeon Chemical L.P.)

EXAMPLES 1–9 AND COMPARATIVE EXAMPLES 1–3

Epoxy resin compositions described in Examples 1–6 and Control Example 1 were prepared by blending epoxy resin A–E, curing agent A–C, liquid rubber A, and solid rubber A as shown in Table 1–3, respectively. Liquid rubber A was prepared as pre-reacted master blend with epoxy resin B (for Example 9) or epoxy resin C (For Example 1–8, Comparative Example 1). This master blend is prepared by mixing 750 g of epoxy resin and 250 g of liquid rubber with 2.5 g of triphenyl phosphine at 150 deg C. for 1 hour. Solid rubber A was prepared as master blend with epoxy resin E (solid rubberA/epoxy resin E=87.6/1.0 by weight). This master blend is prepared by following procedure; (1) Solid rubber A was dispersed into acetone as solvent to obtain 15 wt % solid rubber contents solution, (2) Mixed the solution with epoxy resin E, (3) the solvent was then removed by placing the mixture in a vacuum oven for 1 hour at the condition of 50 deg C. and <10 mmHg. A resin sample was degassed and poured into a mold consisting of 330 mm×330 mm×12.7 mm polished steel plates, separated by 12.7 mm polytetrafluoroethylene spacers. The cast mixtures were pre-cured at 80 deg C. for 120 min and at 120 deg C. for 60 min, and then cured at 135 deg C. for 90 minutes in an oven. After cooling, the cast sheet was demolded and prepared for testing by the following methods: ASTM D-695 (compression); and ASTM D-5045 (fracture toughness). The glass transition temperature (Tg) of cured resin was determined by differential scanning calorimeter (DSC) by Perkin-Elmer DSC 7 instrument. It should be noted that the Tg referred to herein and throughout the specification means the half width value of glass transition region at 10 deg C./minute temperature ramp from room temperature to 300 deg C. Phase separated morphology was observed by optical microscopy and H means Homogeneously dispersed (Domain could not been observed), D means dispersed (Maximum domain size is at most 3 μm) and I means insoluble (Maximum domain size was more than 3 μm).

Fiber reinforced-composite materials comprising these resin composition was prepared by using TORAYCA T800HB-12K-40B carbon fiber and resin from the present invention, at 36.5% resin content and 120 grams per square meter fiber aerial weight. 0° Compression Strength using ASTM method's D-3410 and D-695 yielded the following results. Tack was measure by touching the prepreg by finger after one week the prepreg had been manufactured and good means it was sticky after one week, okay means it has some stickiness after one week, and N/G means not sticky at all after one week. The composite laminate mechanical properties results were normalized to 60% fiber volume.

Preferably, a component of the epoxy resin should have an epoxy equivalent weight of at least 400 to compatibilize epoxy and rubber and to obtain both higher strengths in compression and toughness as shown by comparing the results of Example #4 and Comparative Example #2.

The preferred rubber in the epoxy resin composition is the liquid rubber versus a solid rubber that is solid at room temperature. Applicants found two reasons for the above preference. First, a solid rubber needs to be dissolved in a solvent prior to use and the remaining solvent in resin formulation causes voids in the cured material, which results in deteriorated mechanical strength. Second, a solid rubber has less compatibility to epoxy than liquid epoxy. These observations of the Applicants are based on Example #4 and Comparative Example #3.

The Applicants also found that a liquid rubber that forms no visible domains by optical microscopy or has a maximum domain size of 3 microns or less in the cured material is preferred over a liquid rubber that forms larger domains. When the domain size of rubber is greater than 3 microns than the rubber domain acts like a "void" in the cured material, which results in deteriorated mechanical strength as those shown in Comparative Example #3. Thus to avoid this effect, the rubber should exist in small domains.

The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein.

This application discloses several numerical range limitations. The numerical ranges disclosed inherently support any range within the disclosed numerical ranges even though a precise range limitation is not stated verbatim in the specification because this invention can be practiced throughout the disclosed numerical ranges. Finally, the entire disclosure of the patents and publications referred in this application are hereby incorporated herein by reference.

TABLE 1

| | | | | Example | | | | | |
|---|---|---|---|---|---|---|---|---|---|
| | | | | 1 | 2 | 3 | 4 | 5 | 6 |
| Resin Compositions (phr) | Component | (A) | Epoxy resin B (EEW: 525–550) | | | | | | |
| | | | Epoxy resin C (EEW: 875–975) | 1.2 | 2.3 | 5.8 | 10.5 | 2.3 | 3 |
| | | (B) | Curing agent A | 5.1 | 5.1 | 5.1 | 5.1 | 5.1 | 4.6 |
| | | | Curing agent B | 3.3 | 3.3 | 3.3 | 3.3 | | 2.8 |
| | | | Curing agent C | | | | | 3.3 | |
| | | (C) | Liquid rubber A | 0.5 | 1.0 | 2.5 | 4.5 | 1.0 | 1.2 |
| | Other Compression | | Epoxy resin A (EEW: 185–192) | 10.1 | 10.1 | 10.1 | 10.1 | 10.1 | |
| | | | Epoxy resin D (EEW: 117–134) | | | | | | 26 |
| | | | Epoxy resin E (EEW: 191–210) | 88.7 | 87.6 | 84.1 | 79.4 | 87.6 | 71 |
| | | | Thermoplastic additive A (PVF) | | | | | | |
| | | | Solid rubber A | | | | | | |
| Cured resin Properties | | | Modulus (GPa) | 4.1 | 3.9 | 3.8 | 3.5 | 3.8 | 3.8 |
| | | | Ultimate Strength (MPa) | 148 | 143 | 140 | 131 | 141 | 143 |
| | Fracture Toughness | | $K_{Ic}$ (MPa/m^1/2) | 0.63 | 0.69 | 0.78 | 0.89 | 0.65 | 0.64 |
| | Heat Resistance | | Tg (deg C, DSC half width) | 167 | 165 | 163 | 159 | 169 | 168 |
| | Phase separated morphology | | | H | H | D | D | H | H |
| | (Maximum liquid rubber domain size, μm) | | | | | | (0.3) | (0.4) | |
| FRP properties | Compression | | Ultimate Strength (MPa) | 240 | 237 | 225 | 210 | 233 | 234 |
| | Prepreg handling properties | | Finger touch (Good/Okay/N/G) | Okay | Good | Good | Good | Good | Good |

TABLE 1-continued

|  |  |  |  | Example | | | Comparative Example | |
|---|---|---|---|---|---|---|---|---|
|  |  |  |  | 7 | 8 | 9 | 2 | 3 |
| Resin Compositions (phr) | Component | (A) | Epoxy resin B (EEW: 525–550) |  |  | 2.3 |  |  |
|  |  |  | Epoxy resin C (EEW: 875–975) | 10 | 10 |  | 2.3 | 10.5 |
|  |  | (B) | Curing agent A | 5.5 | 5.0 | 5.1 | 5.1 | 5.1 |
|  |  |  | Curing agent B | 3.0 | 3.0 | 3.3 | 3.3 | 3.3 |
|  |  |  | Curing agent C |  |  |  |  |  |
|  |  | (C) | Liquid rubber A | 1.0 | 5.0 | 1.0 | 4.5 |  |
|  | Other Compression |  | Epoxy resin A (EEW: 185–192) | 35 | 15 | 10.1 | 10.1 | 10.1 |
|  |  |  | Epoxy resin D (EEW: 117–134) |  |  |  | 20.6 |  |
|  |  |  | Epoxy resin E (EEW: 191–210) | 55 | 75 | 87.6 | 87.6 | 79.4 |
|  |  |  | Thermoplastic additive A (PVF) |  | 3.0 |  |  |  |
|  |  |  | Solid rubber A |  |  |  |  | 4.5 |
| Cured resin Properties |  |  | Modulus (GPa) | 3.5 | 3.3 | 4.1 | 4.0 | 3.4 |
|  |  |  | Ultimate Strength (MPa) | 133 | 130 | 148 | 145 | 125 |
|  | Fracture Toughness |  | $K_{Ic}$ (MPa/m$^{1/2}$) | 0.73 | 1.01 | 0.60 | 0.53 | 0.55 |
|  | Heat Resistance |  | Tg (deg C, DSC half width) | 158 | 160 | 164 | 169 | 162 |
|  | Phase separated morphology (Maximum liquid rubber domain size, μm) |  |  | H | D (0.5) | H | H | D (1.5) |
| FRP properties | Compression |  | Ultimate Strength (MPa) | 218 | 209 | 225 | 240 | 200 |
| Prepreg handling properties |  |  | Finger touch (Good/Okay/N/G) | Good | Good | Okay | N/G | Okay |

Comparative Example 3 continued values:
- Modulus: 3.4
- Ultimate Strength: 121
- $K_{Ic}$: 0.53
- Tg: 161
- Phase separated morphology: I
- FRP Ultimate Strength: 196
- Finger touch: Good

What is claimed is:

1. An epoxy resin composition, comprising:

an epoxy resin comprising an epoxy compound X and an epoxy compound Z, the epoxy compound X being a bisphenal A resin and having an epoxy equivalent weight of at least about 400, and the epoxy resin compound Z having a functionality of at least about 2.2 and being selected from the group consisting of phenol-novolak epoxy resins, glycidyl amine epoxy resins and cresol-novolak epoxy resins, a curing agent, and a liquid rubber that is liquid at room temperature and comprises a reactive group;

wherein the liquid rubber forms no visible domains by optical microscopy or has a maximum domain size of 3 microns or less when the epoxy resin composition is cured, further wherein the liquid rubber is about 0.1 to about 5 parts by weight per 100 parts by weight of the epoxy resin of the epoxy resin composition.

2. The epoxy resin composition of claim 1, wherein the liquid rubber comprises at least about 10 weight percent of acrylonitrile.

3. The epoxy resin composition of claim 1, wherein the liquid rubber comprises at least about 17 weight percent of acrylonitrile.

4. The epoxy resin composition of claim 1, wherein the epoxy compound X has a solubility parameter value of SpX, the liquid rubber has a solubility parameter value SpY and the ratio of SpY/SpX is in the range of about 0.7 to about 1.3.

5. The epoxy resin composition of claim 1, wherein the epoxy compound X has a solubility parameter value of SpX, the liquid rubber has a solubility parameter value SpY and the ratio of SpY/SpX is in the range of about 0.8 to about 1.2.

6. The epoxy resin composition of claim 1, wherein the epoxy compound X has a solubility parameter value of SpX, the liquid rubber has a solubility parameter value SpY and the ratio of SpY/SpX is in the range of about 0.9 to about 1.1.

7. The epoxy resin composition of claim 1, wherein a total amount of the epoxy compound Z is at least about 50 parts by weight per 100 parts by weight of the epoxy resin of the epoxy resin composition.

8. A cured article comprising reinforcing fibers and the epoxy resin composition of claim 1.

9. An epoxy resin composition, comprising:

an epoxy resin comprising an epoxy compound X and an epoxy compound Z, the epoxy compound X being a bisphenol A resin and having an epoxy equivalent weight of at least about 400, and the epoxy resin compound Z having a functionality of at least about 2.2 and being selected from the group consisting of phenol-novolak epoxy resins, glycidyl amine epoxy resins and cresol-novolak epoxy resins, a curing agent, and a liquid rubber that is liquid at room temperature and comprises (i) at least about 10 weight percent of acrylonitrile and (ii) a reactive group, wherein the liquid rubber is about 0.1 to about 5 parts by weight per 100 parts by weight of the epoxy resin of the epoxy resin composition.

10. The epoxy resin composition of claim 9, wherein the liquid rubber comprises at least about 17 weight percent of acrylonitrile.

11. A cured article comprising reinforcing fibers and the epoxy resin composition of claim 9.

12. The epoxy resin composition of claim 9, wherein a total amount of the epoxy compound Z is at least about 50 parts by weight per 100 parts by weight of the epoxy resin of the epoxy resin composition.

13. The epoxy resin composition of claim 1 or 9, wherein the epoxy compound X has an epoxy equivalent weight from about 600 to about 3000.

14. The epoxy resin composition of claim 1 or 9, wherein the epoxy compound X has an epoxy equivalent weight from about 800 to about 1700.

15. The epoxy resin composition of claim 1 or 9, wherein the liquid rubber is pre-reacted with the epoxy compound X.

16. The epoxy resin composition of claim 1 or 9, wherein the liquid rubber forms no visible domains by optical microscopy or has the maximum domain size is 1 micron or less.

17. The epoxy resin composition of claim 1 or 9, wherein the liquid rubber forms no visible domains by optical microscopy or has the maximum domain size is 0.6 micron or less.

18. The epoxy resin composition of claim 1 or 9, wherein the liquid rubber disperses in the-epoxy resin composition when the epoxy resin composition is cured.

19. A prepreg comprising reinforcing fibers impregnated with an epoxy resin composition, comprising:
   an epoxy resin comprising an epoxy compound X and an epoxy compound Z, the epoxy compound X being a bisphenol A resin and having an epoxy equivalent weight of at least about 400, and the epoxy resin compound Z having a functionality of at least about 2.2 and being selected from the group consisting of phenol-novolak epoxy resins, glycidyl amine epoxy resins and cresol-novolak epoxy resins,
   a curing agent, and
   a liquid rubber that is liquid at room temperature and comprises a reactive group;
   wherein the liquid rubber forms no visible domains by optical microscopy or has a maximum domain size of 3 microns or less when the epoxy resin composition is cured, further wherein the liquid rubber is about 0.1 to about 5 parts by weight per 100 parts by weight of the epoxy resin of the epoxy resin composition.

20. A prepreg of claim 19, wherein the reinforcing fibers are selected from the group consisting of carbon fibers, aromatic polyamide fibers, glass fibers, silicon carbide fibers, boron fibers, alumina fibers, stainless steel fibers, tungsten fibers and nylon fibers.

21. A composite tube or rod comprising reinforcing fibers and an epoxy resin composition, comprising:
   an epoxy resin comprising an epoxy compound X and an epoxy compound Z, the epoxy compound X being a bisphenol A resin and having an epoxy equivalent weight of at least about 400, and the epoxy resin compound Z having a functionality of at least about 2.2 and being selected from the group consisting of phenol-novolak epoxy resins, glycidyl amine epoxy resins and cresol-novolak epoxy resins,
   a curing agent, and
   a liquid rubber that is liquid at room temperature and comprises a reactive group;
   wherein the liquid rubber forms no visible domains by optical microscopy or has a maximum domain size of 3 microns or less when the epoxy resin composition is cured, further wherein the liquid rubber is about 0.1 to about 5 parts by weight per 100 parts by weight of the epoxy resin of the epoxy resin composition.

22. Sporting goods made of the composite tube or rod of claim 21.

23. Fishing rods, arrows, golf shafts or hockey sticks made of the composite tube or rod of claim 21.

24. A composite tube or rod comprising reinforcing fibers and an epoxy resin composition, comprising:
   an epoxy resin comprising an epoxy compound X and an epoxy compound Z, the epoxy compound X being a bisphenol A resin and having an epoxy equivalent weight of at least about 400, and the epoxy resin compound Z having a functionality of at least about 2.2 and being selected from the group consisting of phenol-novolak epoxy resins, glycidyl amine epoxy resins and cresol-novolak epoxy resins,
   a curing agent, and
   a liquid rubber that is liquid at room temperature and comprises (i) at least about 10 weight percent of acrylonitrile and (ii) a reactive group; wherein the liquid rubber is about 0.1 to about 5 parts by weight per 100 parts by weight of the epoxy resin of the epoxy resin composition.

25. A prepreg comprising reinforcing fibers impregnated with an epoxy resin composition, comprising:
   an epoxy resin comprising an epoxy compound X and an epoxy compound Z, the epoxy compound X being a bisphenol A resin and having an epoxy equivalent weight of at least about 400, and the epoxy resin compound Z having a functionality of at least about 2.2 and being selected from the group consisting of phenol-novolak epoxy resins, glycidyl amine epoxy resins and cresol-novolak epoxy resins,
   curing agent, and
   a liquid rubber that is liquid at room temperature and comprises (i) at least about 10 weight percent of acrylonitrile and (ii) a reactive group; wherein the liquid rubber is about 0.1 to about 5 parts by weight per 100 parts by weight of the epoxy resin of the epoxy resin composition.

26. A prepreg of claim 25, wherein the reinforcing fibers are selected from the group consisting of carbon fibers, aromatic polyarnide fibers, glass fibers, silicon carbide fibers, boron fibers, alumina fibers, stainless steel fibers, tungsten fibers and nylon fibers.

* * * * *